United States Patent [19]
Stobbe et al.

[11] Patent Number: 6,126,833
[45] Date of Patent: Oct. 3, 2000

[54] CROSS-FLOW FILTRATION DEVICE WITH FILTRATE CONDUIT NETWORK AND METHOD OF MAKING SAME

[75] Inventors: Per Stobbe, Frederiksberg, Denmark; Bruce A. Bishop, Arlington; Robert L. Goldsmith, Wayland, both of Mass.

[73] Assignees: CeraMem Corporation, Waltham, Mass.; Stobbe Tech Holding A/S, Frederiksberg, Denmark

[21] Appl. No.: 09/306,152

[22] Filed: May 6, 1999

Related U.S. Application Data

[60] Provisional application No. 60/121,162, Feb. 22, 1999.

[51] Int. Cl.[7] .................................................. B01D 61/00
[52] U.S. Cl. ................. 210/650; 210/510.1; 210/500.25; 210/500.26; 210/500.27; 210/490; 55/523; 55/524
[58] Field of Search ......................... 210/500.25, 500.26, 210/510.1, 500.27, 490; 55/524, 523

[56] References Cited

U.S. PATENT DOCUMENTS

| | | |
|---|---|---|
| 3,712,473 | 1/1973 | Ellenburg . |
| 4,032,454 | 6/1977 | Hoover et al. . |
| 4,041,591 | 8/1977 | Noll et al. . |
| 4,041,592 | 8/1977 | Kelm . |
| 4,069,157 | 1/1978 | Hoover et al. . |
| 4,126,178 | 11/1978 | Kelm . |
| 4,222,874 | 9/1980 | Connelly . |
| 4,338,273 | 7/1982 | Schnedecker . |
| 4,419,108 | 12/1983 | Frost et al. ........................... 210/510.1 |
| 4,426,762 | 1/1984 | Schnedecker . |
| 4,427,424 | 1/1984 | Charpin et al. . |
| 4,518,635 | 5/1985 | Schnedecker et al. . |
| 4,781,831 | 11/1988 | Goldsmith . |
| 5,009,781 | 4/1991 | Goldsmith . |
| 5,108,601 | 4/1992 | Goldsmith . |
| 5,497,620 | 3/1996 | Stobbe ...................................... 55/523 |
| 5,641,332 | 6/1997 | Faber et al. . |
| 5,855,781 | 1/1999 | Yorita et al. . |

*Primary Examiner*—Ana Fortuna
*Attorney, Agent, or Firm*—Richard P. Crowley

[57] ABSTRACT

A cross-flow filtration device which receives a feed stock at a feed end face and separates the feed stock into filtrate and retentate. The device has a structure formed from a plurality of substantially parallel monolith segments of porous material, each segment having a plurality of passageways which extend longitudinally from the feed end face to a retentate end face of the structure. The structure contains a filtrate conduit network comprised of both an intersegment filtrate conduit, formed by the arrangement of the segments, and at least one intrasegment filtrate conduit formed within at least one segment. The filtrate conduit network provides low pressure drop flow paths for filtrate flow through the porous material from the passageways to nearby filtrate conduits, and at least some of the passageways are separated from filtrate conduits by intervening passageways, thereby enabling a high ratio of passageway surface area to volume of the device and a high rate of filtrate removal.

20 Claims, 5 Drawing Sheets

CROSS-FLOW FILTRATION DEVICE WITH FILTRATE CONDUIT NETWORK AND METHOD OF MAKING SAME

REFERENCE TO PRIOR APPLICATION

This application incorporates by reference and claims the benefit of U.S. Provisional Patent Application Ser. No. 60/121,162, filed Feb. 22, 1999.

BACKGROUND OF THE INVENTION

There is a multitude of filtration devices which separate a feed stock into filtrate and retained suspended matter which is too large to pass through the pore structure of the filter. A straight-through filter retains the suspended matter on the filter surface or within the filter matrix and passes only the filtrate. Cross-flow filters operate with tangential flow across the filter surface to sweep away suspended matter unable to pass through the filter surface pores. Cross-flow filters provide for the continuous extraction of retentate, or concentrated suspended matter, from one portion of the device and continuous extraction of filtrate from another portion.

As is well-known in the art, the filtration rate of cross-flow filters is generally limited by the resistance of a filter cake that builds up on the filter surface. The thickness and corresponding resistance of this cake is controlled by the cross-flow velocity. This phenomenon of cake thickness controlled by concentration polarization of retained suspended matter is extensively described in the technical literature. In order to obtain the maximum filtration rate, cross-flow filters are normally constructed from porous materials which have a low resistance to filtrate flow relative to that of the filter cake. That is, in operation the pressure drop across the porous filter itself is low relative to the pressure drop across the filter cake, and the resistance of the latter is determined by hydrodynamic flow conditions across the filter surface.

Cross-flow filters can be constructed using multiple-passageway, porous monoliths. Such monoliths can have tens to thousands of passageways extending through them, with the passageways normally parallel and uniformly spaced. When in use the feed stock is introduced under pressure at one end of the monolith, flows in parallel through the passageways, and is withdrawn as retentate at the downstream end of the device.

Filtrate which passes into the porous monolith walls separating the passageways combines and flows through the walls toward the periphery of the monolith, and is removed through the outer skin of the monolith. The resistance to flow in the torturous flow path of the monolith passageway walls can severely limit filtration capacity, and for this reason cross-flow filters based on large diameter, high surface area, multiple passageway, porous monoliths are not found in commercial use unless they incorporate some means to overcome this limitation.

Membrane devices utilize a semipermeable membrane to separate filtrate, also called permeate, from retentate. There is a multitude of different pressure driven membrane devices which separate and concentrate particles, colloids, macromolecules, low molecular weight molecules, and separate gases. Membranes generally require a mechanical support which can be integral with the membrane, or separate. For example, membranes can be coated onto, or simply mechanically supported by, a porous support material.

Multiple-passageway, porous monoliths can be especially useful as membrane supports. In this instance membranes are applied to the passageway walls, which serve both as a mechanical support and as the flow path for filtrate removal to a filtrate collection zone. A high flow resistance of the passageway walls of the monolith can be troublesome first in that it can prevent adequate formation of membranes, for example, by dynamic formation procedures. Second, if membranes are otherwise applied to the monolith passageway walls, the resistance of the passageway walls to filtrate flow can limit device capacity. This limitation has clearly been recognized by developers of such devices, for example, by Hoover and Roberts in U.S. Pat. No. 4,069,157, issued Jan. 17, 1978. That patent teaches a solution to such limitation by limiting a number of parameters to values within specific ranges. The surface area of the passageways per unit volume, the porosity of the support, and the proportion of the volume of the support materials exclusive of the passageways to the total volume of the support are defined within certain ranges, and are combined to define an allowable range of a permeability factor for the support.

Other monolith based membrane devices have been developed in many countries, including the United States, France, Germany, the United Kingdom, the Netherlands, Japan, and The People's Republic of China. For these devices practitioners also have recognized a support permeability limitation and have generally overcome this limitation by use of monoliths with a combination of small overall diameter, relatively few feed passageways and large pore size of the support material. Several commercially available membrane devices utilize a number of small diameter monoliths, each with up to 37 passageways, distributed within a cylindrical housing. Filtrate exits from the sides of each monolith and mixes with the filtrate from the other monoliths, after which it is collected. The overall packing density, or membrane area per unit volume, of these devices is relatively low.

The monoliths used by all the above sources as supports for membrane devices have had the common characteristic of employing passageways which are substantially uniformly spaced throughout the support. Given this constraint, product developers have worked with variables such as those detailed by Hoover and Roberts in the above referenced patent to avoid filtrate flow path limitations.

Thus the flow resistance of the passageway walls of porous monoliths can be a limiting factor in the use of monoliths either as cross-flow filtration devices or as membrane supports in membrane devices. Further this limitation becomes increasingly severe as the packing density, or effective filter or membrane area per unit volume, of the device increases.

Other developers of monolith based devices have used means of filtrate removal other than along the sides of the monolith device. One category of such filtration devices is a balanced pressure system. In this device one or more of the passageways is used to remove filtrate in a longitudinal manner rather than in the radial manner of Hoover and Roberts cited above. Such devices include those of Ellenburg in U.S. Pat. No. 3,712,473, issued Jan. 23,1973; Hoover and Roberts in U.S. Pat. No. 4,032,454, issued Jun. 28, 1977; and Connelly in U.S. Pat. No. 4,222,874, issued Sep. 16, 1980. For these devices a primary reason for selecting this mode of filtrate removal is to be able to pressurize the monolith exterior surface with feed material in order to keep the monolith under a compressive force, thereby minimizing the potential of monolith mechanical failure. Connelly further teaches the use of radial filtrate ducts to reduce resistance to filtrate radial flow within a large diameter monolith to a central longitudinal filtrate duct.

Such radial filtrate ducts pass through the porous monolith material and do not intersect any of the longitudinal passageways. This arrangement of radial filtrate ducts is such that it is physically difficult to utilize monoliths of high packing density, and the devices of Connelly have packing densities of below about 100 square feet of feed passageway area per cubic foot of monolith structure.

Yet other developers of monolith based devices have provided modifications to accomplish multiple flow path bodies. For example, in the heat exchange devices of Kelm, U.S. Pat. Nos. 4,041,592, issued Aug. 16, 1977; and 4,126,178, issued Nov. 21, 1978; and Noll et al., U.S. Pat. No. 4,041,591, issued Aug. 16, 1977; two fluids enter separately into a body, are maintained separately within the body, and exit separately. Thermal exchange occurs between the two fluids but there is no transfer of matter. Kelm and Noll et al. state that a porous body can be used for filtration or osmosis processes, but no further teaching is provided.

Still other developers of monolith based devices have provided modifications to provide multiple flow path bodies. Charpin, U.S. Pat. No. 4,427,424, issued Jan. 24, 1984, discloses such devices fabricated from fine pored gas separation membranes. Schnedecker, U.S. Pat. Nos. 4,338,273, issued Jul. 6, 1982; 4,426,762, issued Jan. 24, 1984; and Schnedecker et al., U.S. Pat. No. 4,518,635, May 21, 1985, describe processes for fabricating such devices useful for heat exchange and ultrafiltration.

The devices of Kelm, Noll, Charpin and Schnedecker when considered for filtration or membrane devices all have the characteristic that the transport of matter is considered to occur primarily from high pressure feed passageways through adjoining walls directly into low pressure filtrate passageways. Accordingly, the devices disclosed have each feed passageway adjacent to a filtrate passageway.

The devices of Faber and Frost, U.S. Pat. No. 5,641,332, issued Jun. 24, 1997, disclose single monolith based membrane devices which have passageway walls of varying thickness as a means of addressing permeate carrying capacity of monoliths when used as membrane supports. Analogously, the devices of Yorita et al., U.S. Pat. No. 5,855,781, issued Jan. 5, 1999, disclose single monolith devices which have thicker and thinner sections of monolith passageway walls, with filtrate conduit holes drilled through the thicker sections. Yorita et al., also disclose single monoliths with complex open slots which form filtrate conduits.

Goldsmith, U.S. Pat. Nos. 4,781,831, issued Nov. 1, 1988; 5,009,781, issued Apr. 23, 1991; and 5,108,601, issued Apr. 28, 1992; herein incorporated by reference, disclose a variety of monolith structures used as cross-flow filtration devices and membrane devices. These structures are based on individual large-diameter monoliths with filtrate conduits formed with the monolith as well as structures of closely packed monoliths with filtrate conduits formed by the spaces among the individual monoliths. These devices allowed different means of filtrate removal, including along the side or sides of a structure or extracted through tubes or ducts and the ends of the structures. These devices include either single large monoliths with internal filtrate conduits or closely packed assemblies of smaller monoliths without internal filtrate conduits, but not both.

Important considerations in the production costs of cross-flow filtration and membrane devices include both the cost of the monolith and the labor costs for handling the monoliths. For small diameter (or other characteristic dimension) monoliths, the cost for equipment to extrude, dry and fire the monoliths is modest. Equipment costs to produce larger diameter monoliths can be quite high. Further, monoliths of larger diameter are difficult to dry and fire and achieve high production yields. These considerations are affected by monolith material and passageway structure, among many variables. But, generally, monoliths of diameter much above seven inches require expensive production equipment and can have very low production yields. Considering labor costs, small dimension monoliths have relatively high labor costs per unit filter or membrane area. As monoliths become larger, labor costs per unit filter area, or unit membrane area, decline. For this reason, costs per unit area for a monolith-based cross-flow filtration or membrane device can be expected to pass through a minimum with increasing monolith diameter.

It is within this background that the present invention is to be considered. More specifically, all existing devices based on use of multiple passageway monoliths as cross-flow filtration or membrane devices use either an assembly of relatively small diameter monoliths or single large diameter monoliths with internal filtrate conduits. No prior art discloses an assembly of monoliths which themselves contain one or more internal filtrate conduits.

FIELD OF THE INVENTION

This invention relates to an improved cross-flow filtration device for separating a feed stock into filtrate and retentate, and more particularly to such a device having a filtrate conduit network within the device with low flow resistance which provides enhanced filtrate removal from the interior of the device to a filtrate collection zone external to the device. This invention also relates to an improved membrane device which employs such a cross-flow filtration device as a membrane support.

SUMMARY OF THE INVENTION

It is therefore an object of this invention to provide an improved cross-flow filtration device which readily removes filtrate from the device by incorporating a filtrate conduit network within the device structure.

It is a further object of this invention to provide such a cross-flow filtration device which has a large amount of surface area of its passageways relative to the volume of the device.

It is a further object of this invention to provide such a cross-flow filtration device which effectively utilizes substantially all of its passageways by providing a low pressure drop flow path for filtrate between even the innermost passageways and an external filtrate collection zone associated with the device.

Yet another object of this invention is to provide an improved membrane support for use in a monolithic membrane device in which membranes are supported on the surfaces of its passageways.

This invention results from the realization that the use of monolith structures for cross-flow devices has certain cost and technical limitations. Small diameter (or other characteristic dimension) monoliths generally need no filtrate conduits to achieve effective filtrate removal, yet are expensive to make, per unit filter area, and to install in housings. Large diameter monoliths require modifications to enhance filtrate removal from inner passageways of the monolith, which can be accomplished effectively, but large diameter monoliths require expensive equipment for their production and are difficult to make.

This invention also results from the realization that it is possible to use monoliths of an intermediate diameter (or other characteristic dimension) to create cross-flow filtration devices that possess the advantages of large dimension monoliths. The invention incorporates an assembly of intermediate diameter (or analogous characteristic dimension) monoliths in a structure, which has the monoliths, oriented in a substantially parallel arrangement. This structure combines two types of filtrate conduits, a first intersegment filtrate conduit that is created by the arrangement of the assembly of monoliths, and this first intersegment filtrate conduit is complemented by the use of intrasegment filtrate conduits within the monoliths themselves. This invention circumvents the filtrate removal limitation of monoliths without filtrate conduits and avoids the difficulties of manufacturing large dimension monoliths.

This invention features a cross-flow filtration device which receives a feed stock at a feed end face and separates the feed stock into filtrate and retentate. There is a structure containing a substantially parallel arrangement of a plurality of monolith segments of porous material, each segment containing a plurality of passageways extending longitudinally from the feed end face to a retentate end face of the structure through which the feed stock flows to pass retentate from the device. The surface area of the passageways of the device is at least 100 square feet per cubic foot of the structure. A filtrate collection zone is provided external to the structure, and the structure has a filtrate conduit network for carrying filtrate toward the filtrate collection zone, the filtrate conduit network providing paths of lower flow resistance than that of alternative flow paths through the porous material. The filtrate conduit network contains an intersegment filtrate conduit defined by the arrangement of the monolith segments and at least one intrasegment filtrate conduit within at least one monolith segment, the intrasegment filtrate conduit communicating with the intersegment filtrate conduit or otherwise directing filtrate toward the filtrate collection zone. The filtrate conduit network is isolated from the passageways at both end faces of the structure, at least some of the passageways are separated from the filtrate conduit network by intervening passageways, and a means is provided for isolating the filtrate collection zone from the feed and retentate ends of the structure.

In one embodiment the monolith porous material is a ceramic material, and the ceramic material can be selected from cordierite, alumina, mullite, silica, zirconia, titania, spinel, silicon carbide, or mixtures thereof.

The monolith segments can be formed into a structure by sealing the ends of the segments at the feed end face and the retentate end face into tube sheets. The means of sealing the ends of the segments can be by elastomeric or metallic 0ring or similar seals, rubber boot seals, or organic adhesive or inorganic cement seals.

In yet another embodiment, the monolith segments are formed into a unitary structure by bonding the monolith segments to each other along portions of the inter-segment filtrate conduit.

The filtrate collection zone can be disposed along the side of the structure and a barrier means provided, disposed at the feed and retentate ends of the structure, to inhibit direct passage of the feed stock and retentate into the filtrate collection zone. This barrier means can include an O-ring seal or an elastomeric boot seal.

The characteristic dimension of the monolith segments can be in the range of two to seven inches, and preferably in the range of three to six inches.

The intrasegment filtrate conduit in the individual segment can be a plurality of longitudinal chambers which extend substantially along the entire length of the monolith segment, the chambers transected by a transverse channel which directs filtrate into the intersegment filtrate conduit or otherwise toward the filtrate collection zone. The channel can be formed as a slot in at least one end face of the monolith segment, the slot being sealed at that end face to isolate the slot from the feed stock and the retentate, and the slot communicating with the intersegment filtrate conduit or otherwise toward the filtrate collection zone. additionally, the filtrate chambers can be formed from at least one row of passageways which extends across the monolith segment.

The cross-flow filtration device may further include a permselective membrane applied to the surfaces of the passageways and selected from the group of membranes suitable for microfiltration, ultrafiltration, nanofiltration, reverse osmosis, gas separations, or pervaporation.

This invention further features a method of forming a filtrate conduit network in a structure containing a substantially parallel arrangement of a plurality of monolith segments of porous material, each segment containing a plurality of passageways extending longitudinally from a feed end face to a retentate end face, the surface area of the passageways being at least 100 square feet per cubic foot of the structure.

The method includes arranging the monolith segments to form an intersegment filtrate conduit in the space separating the segments, the intersegment filtrate conduit providing a flow path of low resistance for filtrate flow toward a filtrate collection zone. In addition, within at least one selected segment, an intrasegment conduit is established by selecting a plurality of passageways as filtrate chamber passageways to distribute the filtrate chamber passageways among the nonselected passageways in the selected segment to provide low pressure drop flow paths from the nonselected passageways through the porous material to nearby filtrate chamber passageways, and forming at least one filtrate channel in the selected segment which transects the filtrate chamber passageways, the channel providing a flow path of low path of low resistance for filtrate flow toward the filtrate collection zone or toward the intersegment conduit.

The method also includes sealing the intersegment filtrate conduit at the end faces of the structure to inhibit direct passage of fluid into the intersegment filtrate conduit at the end faces. Also all filtrate chamber passageways and filtrate channels exposed at the end faces of the structure are sealed to inhibit direct passage of fluid into the intrasegment filtrate conduit.

This invention also features a method of separating a feed stream in a cross-flow filtration device into filtrate and retentate by introducing the feed stream into the plurality of the passageways of the device, flowing the filtrate from the passageways through both a intersegment filtrate conduit and at least one intrasegment filtrate conduit into an external filtrate collection zone, and removing the retentate from the device.

DESCRIPTION OF THE DRAWINGS

Other objects, features and advantages will occur from the following description of a preferred embodiment and the accompanying drawings, in which:

FIG. 3 is a cross-sectional view of a nine-monolith cross-flow filtration device, the cross-sectional view analogous to that of the cross sectional view of the four-segment device shown in FIG. 2a.

DESCRIPTION OF THE EMBODIMENTS

This invention may be accomplished by a cross-flow filtration device formed from a plurality of segments of multiple passageway monoliths of a porous material. Each segment contains a plurality of passageways extending longitudinally from the feed end face to a retentate end face of the device through which the feed stock flows to pass retentate from the device, the surface area of the passageways being at least 100 square feet per cubic foot of the device. A filtrate collection zone is provided external to the device. A filtrate conduit network is formed within the device for carrying filtrate toward the filtrate collection zone, the filtrate conduit network providing paths of lower flow resistance than that of alternative flow paths through the porous material.

The device has an intersegment filtrate conduit defined by the arrangement of the monolith segments. At least one segment contains at least one intrasegment filtrate conduit communicating with and carrying filtrate toward the filtrate collection zone. The communication can be through the intersegment filtrate conduit, or directly with the filtrate collection zone, or otherwise indirectly connecting with the filtrate collection zone. Such indirect communication, for example, can be through filtrate ducts as disclosed in U.S. Pat. Nos. 5,009,781, issued Apr. 23, 1991; and 5,108,601, issued Apr. 28, 1992; herein incorporated by reference. Both the intersegment filtrate and the intrasegment filtrate conduits are isolated from the passageways at both end face of the device, and at least some of the passageways are separated from the filtrate conduits by intervening passageways. A means for isolating the filtrate collection zone from the feed and retentate ends of the device is provided.

A device according to this invention is described as a cross-flow filtration device from which filtrate and retentate are extracted, but it is to be recognized that the invention also relates to a porous monolith used as a support for a membrane device from which permeate and retentate are extracted. Hereinafter, the term cross-flow filtration device encompasses a porous monolith support for a membrane device and the term filtrate encompasses permeate extracted from a membrane device. Such membranes can include separation barriers suitable for cross-flow microfiltration, ultrafiltration, nanofiltration, reverse osmosis, gas separations, and pervaporation.

Figure 1:
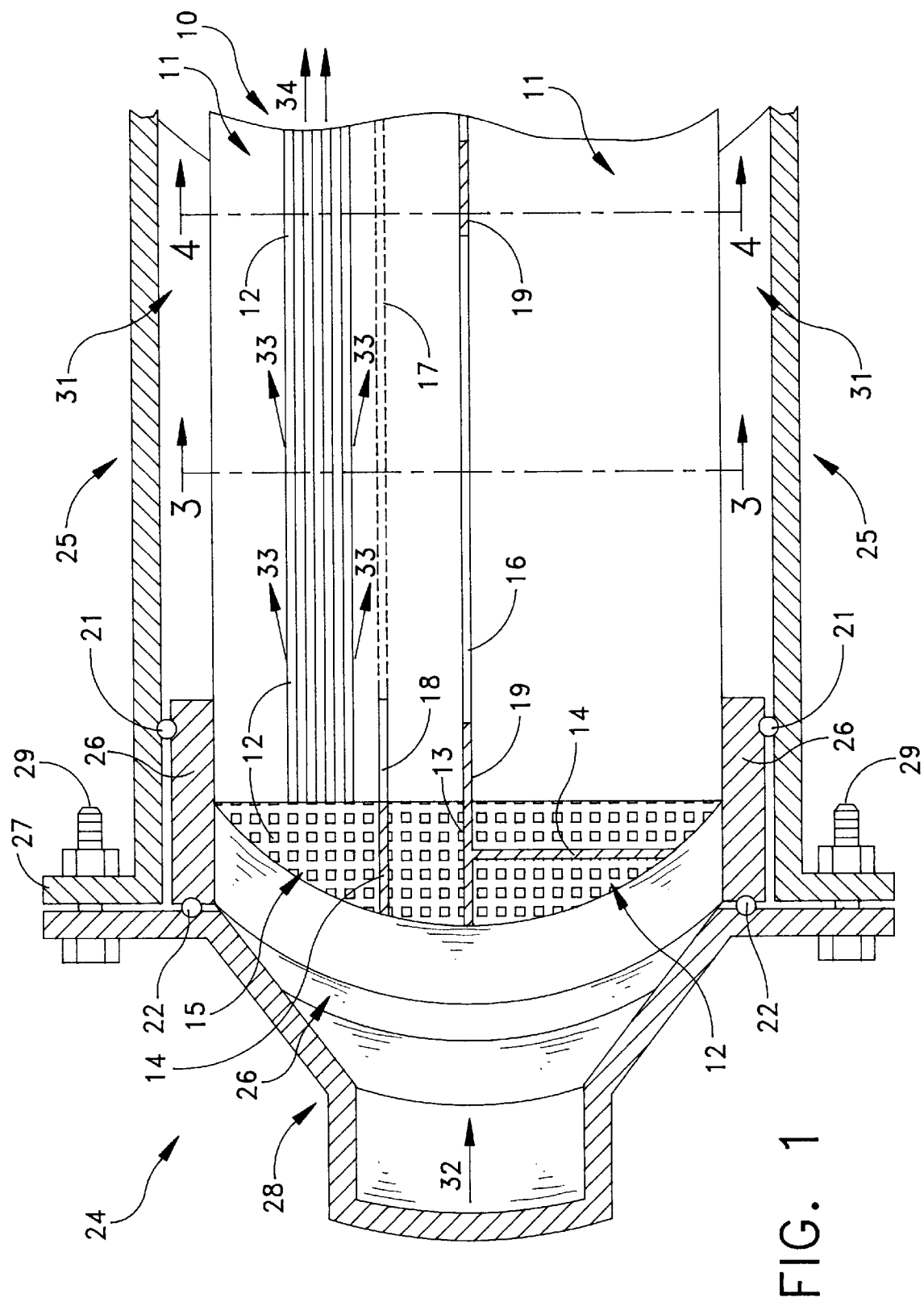
FIG. 1 is a schematic view of a cross-flow filtration device and apparatus according to this invention formed from four monolith segments bonded into a unitary structure, the device contained in a housing with end connection and seals.

FIG. 1 is a cutaway view of cross-flow filtration device 10, a cylindrical device comprised of four monolith segments bonded into a unitary structure. In this cutaway view, two segments 11 are shown, and the view further includes passageways 12 and filtrate conduits 13 and 14. The cutaway view of FIG. 1 is through a portion of the inter-segment filtrate conduit, more specifically the portion of the inter-segment filtrate conduit separating a half-cylinder formed by the two monolith segments 11 from the second half-cylinder formed by the two monolith segments not shown. A cross-section taken slightly to either side of the one chosen would expose passageways 12 extending from the feed end face 15 along the length of the structure. Also exposed would be the open space 16 formed by the arrangement of the two segments 11, the open space constituting another portion of the intersegment filtrate conduit.

The segments are arranged such that the space among them is in the form of two intersecting planes extending along the length of the device from the feed end face 15 to its opposing end face, not shown. The planes are perpendicular to each other and a cross-section of this space, that is a cut across the line 3—3 would show the space as an open cross. This space constitutes the intersegment conduit within the device 10.

Each of the two monolith segments 11 has an intrasegment filtrate conduit of the same structure. The intrasegment filtrate conduit of the upper segment is comprised of two parts:

a) a planar row of longitudinal chambers 17, shown in phantom, which is parallel to the intersegment filtrate conduit shown as 16 and perpendicular to the plane of the cutaway view; and b) a transverse slot channel 18 which intersects the chambers 17. The channel 18 communicates with the intersegment filtrate conduit within the device in the plane of the cutaway view taken in FIG. 1 as well as with the filtrate collection zone 31 at the exterior surface of the device at the opposite end of the slot, not shown.

Both the intersegment filtrate conduit 16 and intrasegment filtrate conduits 17, 18, and filtrate conduit 13, 14 are sealed at the feed end face of the device 15 and also at the downstream end face of the device, not shown. The segments 11 are cemented together within the inter-segment conduit 16 with cement lines 19 disposed along portions of the intersegment filtrate conduit 16. In a like manner, the second half-cylinder of the device, not shown, is cemented to the two segments 11 of the half-cylinder shown. The cemented assembly of the four segments forms a unitary device structure.

Feed end face 15 of the device 10 shows the intra-segment filtrate conduit slot 14 sealed at that end face. At the retentate end face an identical plugged slot can be provided. Alternatively, no slot is needed at the retentate end face, but the longitudinal chambers 17 which extend to the retentate end face would be plugged at that end face to prevent communication with the retentate fluid.

Cross-flow filtration device 10 according to this invention is part of cross-flow filtration apparatus 24. The device 10 is contained within an impermeable housing 25 which is flanged at its ends 27. Cylindrical ring end fitting 26 is bonded with cement to the circumference of the cylindrical device 10 at end face 15, and a second end ring fitting is attached at the retentate end face, not shown. End fitting 26 has a radial O-ring seal 21 which forms a seal between device 10 and housing 25, serving to isolate filtrate collected in the filtrate collection zone 31 from feed stock. A second axial O-ring face seal 22 is provided. A flanged end cap 28 is connected to the housing 25 with bolts 29. Assembly of the housing 25 with end cap 28 and tightening with bolts 29 compresses the O-ring seal 22, forming a second seal between the filtrate collection zone 31 and the feed zone at the feed end face 15. An equivalent or identical end cap arrangement is provided, but not shown, at the retentate end of the apparatus.

In operation feed stock is forced under pressure in the direction indicated by arrow 32. Feed end 15 of cross-flow filtration device 10 receives the feed stock and passes the fluid longitudinally through the passageways 12 until it exist from the retentate end, not shown. The plugged portions of the intersegment filtrate conduit 13 and intrasegment filtrate conduits 14 at the feed end face 15 prevent passage of feed stock into either the intersegment filtrate conduit or the intrasegment filtrate conduits. As the feed stock flows along the passageways 12 the filtrate is gradually removed, as indicated by arrows 33, and flows into the filtrate conduit network, as will be described further below and shown in FIG. 2. The filtrate is eventually collected in the filtrate collection zone 31 and removed from the apparatus 24 through a permeate port in the housing 25, not shown. The impermeable retentate continues its passage toward the retentate end face as shown by arrows 34.

As disclosed in U.S. Pat. No. 5,108,601, issued Apr. 28, 1992; incorporated herein by reference, every passageway does not need to be adjacent to a portion of the filtrate conduit network. In practice, an optimum selection of the number of passageways between filtrate conduits is obtained when substantially all passageways, even those most remote from a filtrate conduit, are active in separation. This is preferred, in order to maximize the filter area per unit volume of the device and accordingly the filtrate flow per unit volume of the device. The preferred number of intervening passageways is determined by a complex set of variables including porous material porosity, pore size and pore size distribution, operating pressure level between feed stock and filtrate, concentration of matter retained in the retentate, cake resistance of filter cake which builds on the passageway walls, velocity of fluid along the passageways, the passageway dimension, and other process and device variables.

Cross-flow filtration device 10 can be fabricated from a variety of porous materials, such as ceramics, plastics, metals, or resin-impregnated solids such as sand. Among ceramics, it is desirable to use cordierite, alumina, mullite, silica, zirconia, titania, spinel, silicon carbide, or mixtures thereof. Acceptable porosities of the material range for abut 20% to about 60%, preferably greater than 30%. The mean pore size, while selectable over a wide range, is typically in the range of 2 to 30 microns.

The material used to plug the filtrate conduits 13 and 14 at the feed end face 15, and similarly at the retentate end face, not shown, can be of the same material, or a different material, as the porous material of the monolith segments. The plugging material can be hardened by curing or firing, depending on composition, to provide a positive barrier between the feed stock and retentate, and the filtrate within the filtrate conduits. Preferably, the material used to plug the filtrate conduits at the end faces of the device as well as the cement 19 used to bond the monolith segments 11 together are of the same material as the monolith segments themselves.

Figure 2A:
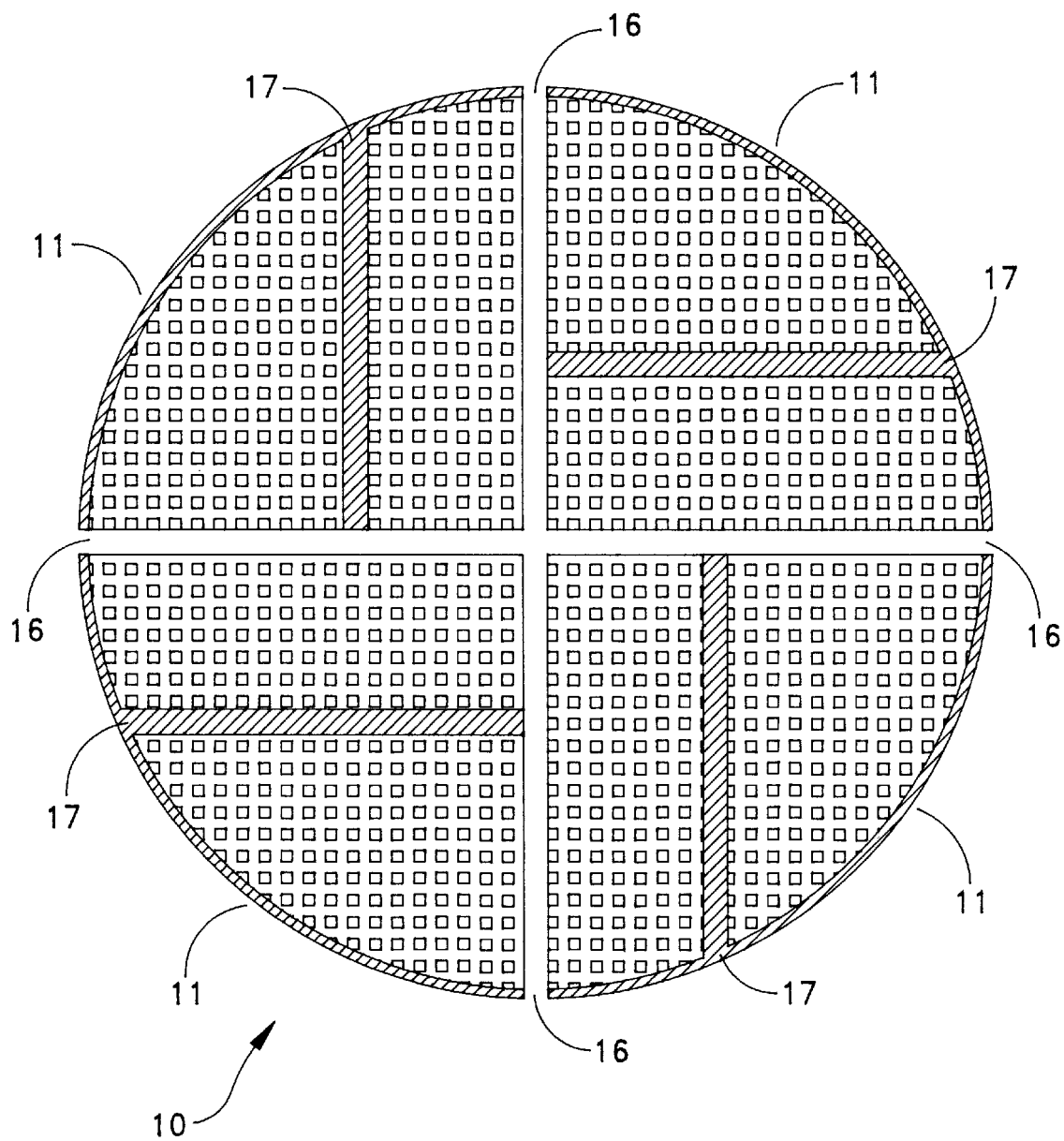
FIGS. 2a and 2b are cross sectional views of the cross-flow filtration device of FIG. 1 along lines 3—3 and 4—4 of FIG. 1 respectively.
Figure 2B:
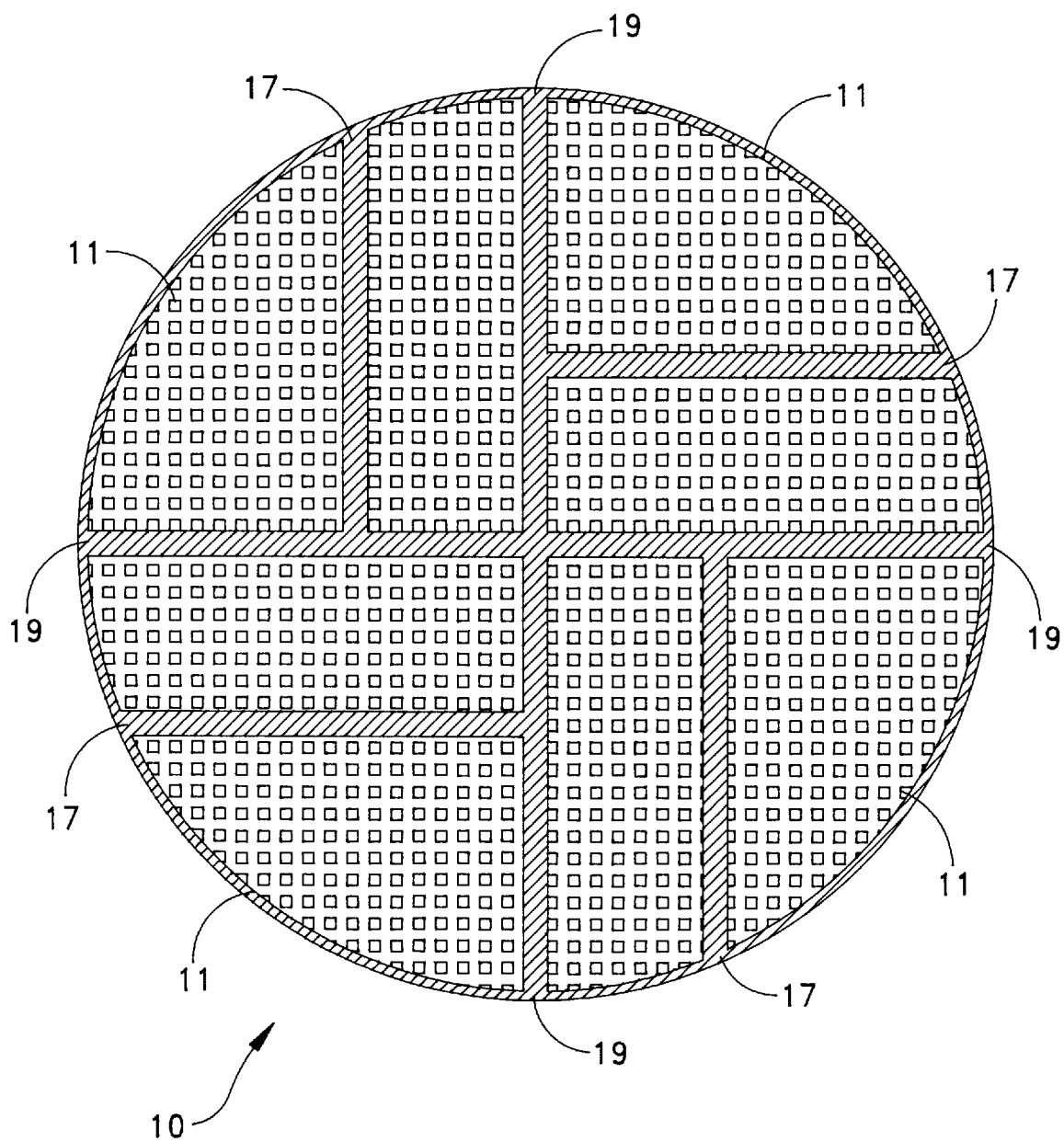

Device 10 is shown in a cross sectional view in FIG. 2a along line 3—3 of FIG. 1. This view is away from an end face and shows the filtrate conduit network in the structure at a location in the device 10 where no cement, used to seal the conduits at the end faces or to bond the monolith segments, is present. The monolith segments 11 contain open longitudinal chambers 17 of the intrasegment filtrate conduit, shown shaded for convenience, which extend substantially along the full length of the segments 11. The intersegment filtrate conduit 16 is open in the view of line 3—3 and similarly along the longitudinal space among the segments 11 except at locations where the cement line bonding the segments 11 is present. This is shown in FIG. 2b where the cement lines 19 fill the inter-segment filtrate conduit among the segments 11.

The intersegment filtrate conduit 16 in device 10 communicates with the filtrate collection zone 31 around the circumference of cylindrical device 10. The intrasegment filtrate conduit chambers shown in FIGS. 2a and 2b do not communicate with any portion of the intersegment filtrate conduit 16 or the filtrate collection zone 31. Rather filtrate flow within the chambers is toward the channel 18 shown in FIG. 1. Filtrate is removed from the channel 18 both into the intersegment filtrate conduit 16 and directly into the filtrate collection zone 31.

Figure 3:
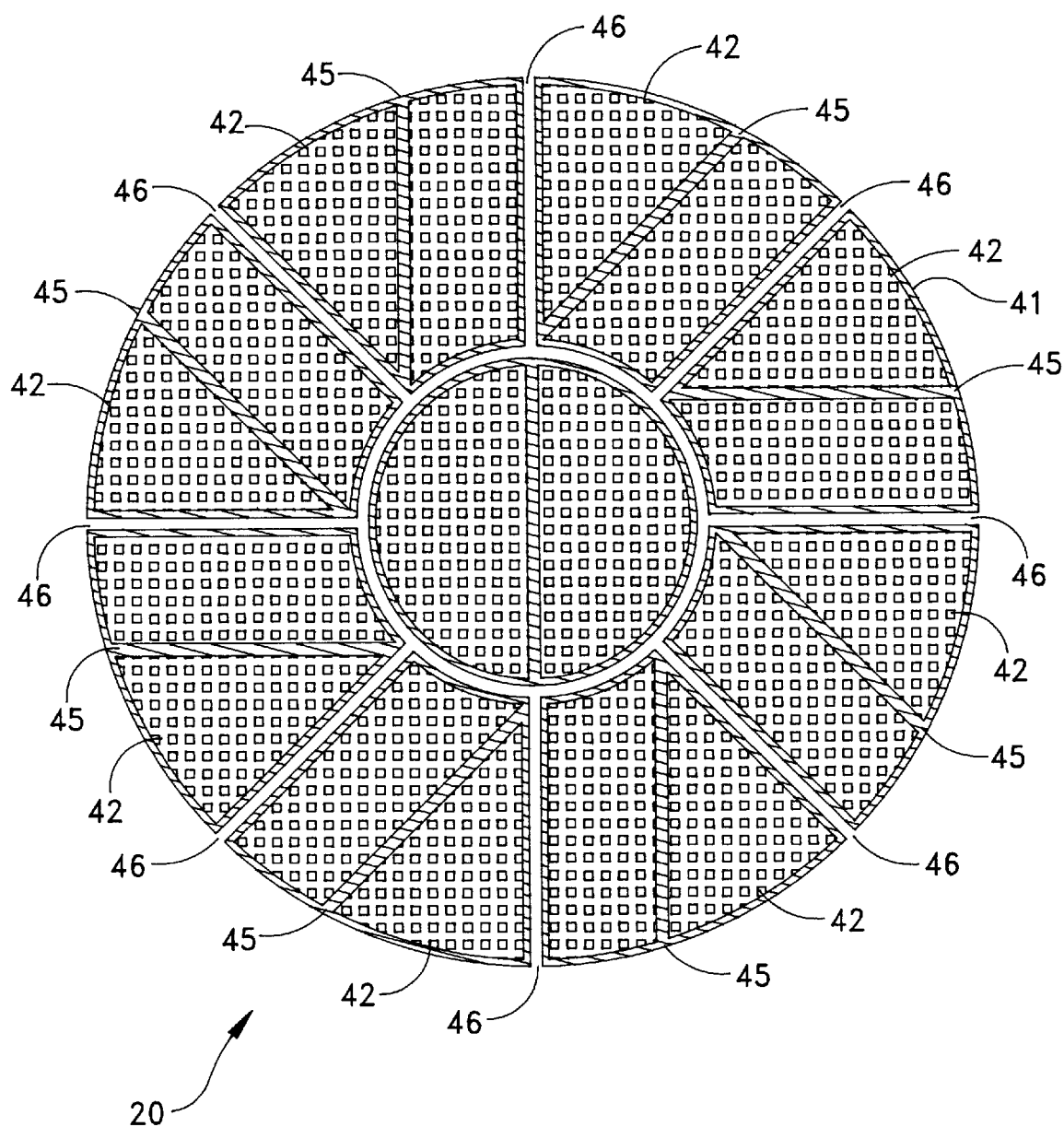

Device 20, FIG. 3, is another device shown in a cross-sectional view analogous to the cross-sectional view of device 10 in FIG. 2a, that is at a location in the device where no cement is present, either to plug conduits at the ends of the device or to cement the monolith segments to each other. The structure of this device is comprised of nine monolith segments. A central core monolith segment 41 is surrounded by a ring of eight monolith segments 42. The intersegment filtrate conduit structure 46 is composed of the annular space around the central core monolith segment 41 as well as the spaces between the ring monolith segments 42. Each monolith segment, 41 and 42 has a row of longitudinal chambers 45, shown shaded for convenience, as part of that segment's intrasegment filtrate conduit. The intersegment filtrate conduit 46 communicates with a filtrate collection zone 31 disposed along the circumference of the cylindrical structure. The intrasegment filtrate chambers of the ring segments communicate with channels at one or both end faces of device 20 in a manner entirely analogous to that of device 10. The channel portions (not shown) of the intrasegment filtrate conduits of the ring segments 42 as well as the intrasegment filtrate conduit channel of the core segment 41 communicate with the filtrate collection zone by discharging into the annular portion of the intersegment filtrate conduit surrounding the core segment 41 within the interior of the structure. The core segment intrasegment conduit channel discharges filtrate entirely into the intersegment filtrate conduit while the channels in the ring segments 42 can also discharge outwardly from the structure directly into the filtrate collection zone 31.

Figure 4:
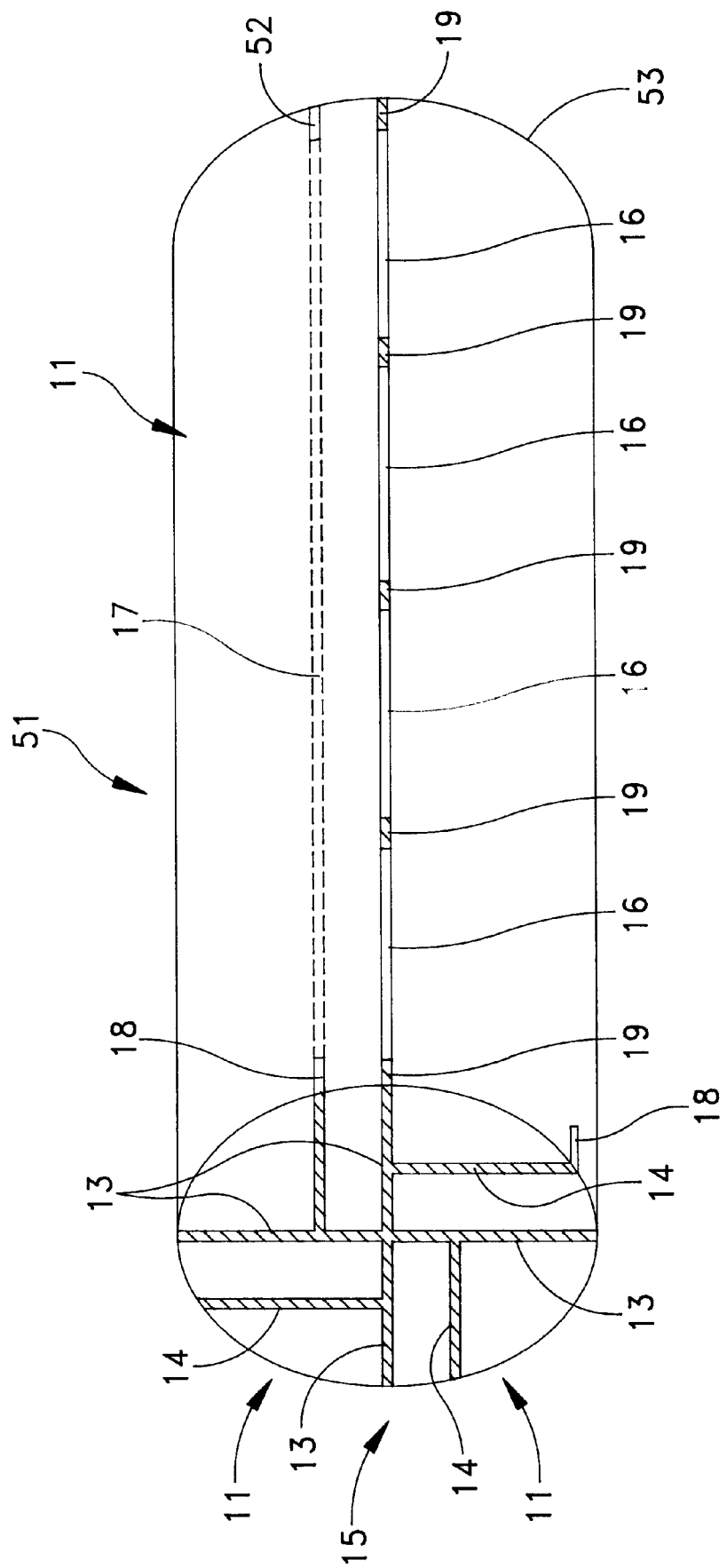
FIG. 4 is a schematic view of the cross-flow filtration device of FIG. 1 showing the unitary structure of the device as formed from four-monolith segments.

The device 10 is shown without the housing and end fitting apparatus in FIG. 4. The segments 11 are bonded one to another to form a unitary structure 51. The cement 19 to bond the segments 11 is applied along a portion of the intersegment filtrate conduit in a series of cement lines, five shown as an example. The amount of cement should be sufficiently small so as not to unduly block filtrate flow within the intersegment filtrate conduit. But, the amount of cement must be sufficiently great to provide bonds of sufficient strength to allow the structure to withstand the mechanical forces applied during use. Preferably, the cement is the same material as the porous material, and if the porous material is ceramic, the cement can be the same ceramic material applied before firing the monolith segments. This will provide a structure of uniform composition.

The longitudinal space 16 among the monolith segments 11 forms a portion of the intersegment filtrate conduit. This intersegment conduit is in the form of two perpendicular planes running longitudinally among the four monolith segment quadrants. The ends of this space are plugged 13 to isolate the intersegment conduit from feed stock at the feed end face 15 and similarly at the retentate end face 53 (cement line not shown). The four monolith segments 11 each have an intrasegment conduit.

Each intrasegment conduit includes a row of passageways extending across a segment 17 (perpendicular to the plane of the drawing and shown in phantom). These passageways are intersected by a slot 18 which forms a channel to conduct filtrate toward the filtrate collection zone 31 as well as toward the intersegment conduit 16 disposed in the interior of the device. The slot is plugged 13 at the feed end face to prevent mixing of the feed stock with filtrate. At the retentate end face 53, in this example, no slots are formed, although this end face can be treated exactly the same as the feed end face. Rather, the ends 52 of the passageways 17 used for the intersegment filtrate conduit are plugged at the retentate end face 53 so as to form chambers which are isolated from the retentate end face of the device.

In FIG. 1, the unitary structure is installed into a housing 25 by bonding an end ring 26 onto each end of the device 10, with O-ring seals, 21 and 22 providing seals to isolate filtrate from feed stock and retentate. As an alternative, elastomeric boots can be substituted for the bonded end rings 26, and the boots can be fitted over the ends of the device so as to form seals analogous to those of O-rings 21 and 22 in FIG. 1. When the device and boots are inserted into the housing 25, compressive seals are made both between the outer circumference of the boots and the inside surface of the housing 25 as well as the end surfaces of the boots and the end caps 28.

The monolith segments 11, or 41, 42, or other shapes, can also be assembled into a structure as individual segments (that is, not bonded into a unitary structure) by installing the individual segments into tube sheets at the ends of the segments. The tube sheets have cavities which conform to the shape of the segments. Seals for the segments into the cavities can be made by several means. One means is to use elastomeric or metallic O-ring or similar seals installed on the sides of the cavities of the tube sheet or on the exterior end surface of the segments. Another means is to use rubber boot seals slipped over the ends of the segments, the boots being compressed to form a seal when the segment is inserted into the tube sheet cavity. Yet another means of sealing is to bond the ends of the segments into the tube sheet cavities with an organic adhesive or an inorganic cement. The tube sheet can be sealed to the inside surface of a housing by O-ring seals analogously to the technique shown in FIG. 1.

A device according to this invention is constructed employing monolith segments which have a characteristic dimension (the largest dimension perpendicular to the axis of the segment) between 2 inches and 7 inches, preferably between 3 inches and 6 inches. Monolith segments of this characteristic dimension, depending on the monolith material and passageway structure can be extruded, dried and sintered, or otherwise produced, with low to moderate cost and high yield. Segments with larger characteristic dimensions can be very expensive to produce, and monoliths with smaller characteristic dimensions can be expensive to assemble into the multi-monolith devices. Also, segments of smaller characteristic dimension generally do not require the intrasegment filtrate conduit to be able to efficiently remove filtrate. The characteristic dimension of smaller diameter segments at which an intrasegment filtrate conduit is required is related to the passageway area per unit volume of the segment. At an area to volume ratio of 100 square feet per cubic foot of segment, for typical porous materials used for cross-flow filtration devices, the maximum characteristic dimension for efficient removal of filtrate is about two inches or smaller.

A characteristic of devices according to this invention is that high surface areas of passageways per unit volume of the devices is achievable. Such high surface area devices have heretofore only been realizable using the monolith devices of Goldsmith as disclosed in U.S. Pat. Nos. 4,781,831, issued Nov. 1, 1988; 5,009,781, issued Apr. 23, 1991; and 5,108,601, issued Apr. 28, 1992. These prior art devices did not disclose nor anticipate the beneficial use of intermediate size monolith segments which themselves contain one or a small number of intrasegment filtrate conduits, such segments clustered into a closely-packed array. This array can be fabricated with a high passageway surface area per unit volume of the device, generally in excess of 100 square feet of passageway wall area per cubic foot volume of the device. Depending on the exact selection of the size of the segments, it may not be necessary that each segment contain an intrasegment filtrate conduit, but it will be advantageous to use a plurality of segments of comparable cross-sectional dimensions, each with at least one intrasegment filtrate conduit.

The devices disclosed herein use monolith segments in a first array of four segments which lacks a core monolith and a second array with a core monolith and one set of eight ring monoliths. For the former case, fewer or more than four segments can be employed. For the second case, fewer or more than eight ring segments can be used. In addition, it is possible to use multiple rings of segments, thereby permitting devices with very large diameters to be advantageously formed from an array of smaller segments.

The filtrate passes from the filtrate conduit network to a filtrate collection zone, which is external to the device. The filtrate collection zone can be disposed along one or more sides of the device or at one or both ends of the monoliths, as described in U.S. Pat. Nos. 4,781,831, issued Nov. 1, 1988; 5,009,781, issued Apr. 23, 1991; and 5,108,601, issued Apr. 28, 1992; and incorporated herein by reference.

While cylindrical structures multiple monolith segments are described in this disclosure, it is to be recognized that other shapes such as square, rectangular or multisided may be employed. Also, passageway shapes other than square, such as round or triangular, and arrays other than square, such as hexagonally spaced, may be employed. Although specific features of the invention are shown in some drawings and not others, this is for convenience only as each feature may be combined with any or all of the other features in accordance with the invention.

While the description above describes a cross-flow filtration device, it is to be recognized that this term describes a device which has a structure to allow introduction of a feed stock and withdrawal of retentate and filtrate. It is to be recognized that this structure can be operated in either a cross-flow mode or in a dead-end mode in which nil or a very small retentate flow is withdrawn.

What is claimed is:

1. A cross-flow filtration device for receiving a feed stock at a feed end face and for separating the feed stock into filtrate and retentate, which device comprises:

a) a structure containing a substantially parallel arrangement of a plurality of monolith segments of porous material, each segment containing a plurality of passageways extending longitudinally from the feed end face to a retentate end face of the structure through which the feed stock flows to pass retentate from the device, the surface area of the passageways being at least 100 square feet per cubic foot of the structure;

b) a filtrate collection zone external to the structure;

c) a filtrate conduit network within the structure for carrying filtrate toward the filtrate collection zone, the filtrate conduit network providing paths of lower flow resistance than that of of alternative flow paths through the porous material;

d) the filtrate conduit network containing an intersegment filtrate conduit defined by the arrangement of the monolith segments and at least one intrasegment filtrate conduit whithin at least one segment, the intrasegment filrate conduit communicating with the intersegment filtrate conduit or otherwise directing the filtrate toward the filtrate collection zone, and wherein the intrasegment filtrate conduit is comprised of a plurality of longitudinal chambers which extend substantially along the entire length of the monolith segment, the chambers being transected by a transverse channel which directs filtrate into the intersegment filtrate conduit or otherwise toward the filtrate collection zone;

e) the filtrate conduit network being isolated from the passageways at both end faces of the structure and at least some of the passageways being separated from the filtrate conduit network by intervening passageways; and f) means for isolating the filtrate collection one from the feed and retentate ends of the structure.

2. The cross-flow filtration device of claim 1 in which the monolith porous material is a ceramic material.

3. The cross-flow filtration device of claim 2 in which the ceramic material is selected from cordierite, alumina, mullite, silica, zirconia, titania, spinel, silicon carbide, or mixtures thereof.

4. The cross-flow filtration device of claim 1 in which the monolith segments are formed into a structure by sealing the ends of the segments at the feed end face and the retentate end face into tube sheets.

5. The cross-flow filtration device of claim 4 in which the means of sealing the ends of the segments is by elastomeric or metallic O-ring or similar seals, rubber boot seals, or organic adhesive or inorganic cement seals.

6. The cross-flow filtration device of claim 1 in which the monolith segments are formed into a unitary structure by bonding the monolith segments to each other along portions of the intersegment filtrate conduit.

7. The cross-flow filtration device of claim 1 in which the filtrate collection zone is disposed along the side of the structure and further includes a barrier means, disposed at the feed and retentate ends of the structure, for inhibiting direct passage of the feed stock and retentate into the filtrate collection zone.

8. The cross-flow filtration device of claim 7 in which the barrier means includes an O-ring seal or an elastomeric boot seal.

9. The cross-flow filtration device of claim 1 in which the characteristic dimension of the monolith segments is in the range of two to seven inches.

10. The cross-flow filtration device of claim 1 in which the characteristic dimension of the monolith segments is in the range of three to six inches.

11. The cross-flow filtration device of claim 1 in which the channel includes at least one slot formed in an end face of the monolith segment, the slot being sealed at that end face to isolate the slot from the feed stock and the retentate, and the slot communicating with the intersegment filtrate conduit or toward the filtrate collection zone.

12. The cross-flow filtration device of claim 1 in which the filtrate chambers are formed from at least one row of passageways which extends across the monolith segment.

13. The cross-flow filtration device of claim 1 further including a permselective membrane applied to the surfaces of the passageways.

14. The membrane device of claim 13 in which the permselective membrane is selected from the group of membranes suitable for microfiltration, ultrafiltration, nanofiltration, reverse osmosis, gas separations, or pervaporation.

15. A cross-flow filtration device for receiving a feed stock at a feed end face and for separating the feed stock into filtrate and retentate, comprising:

a) a structure containing a substantially parallel arrangement of a plurality of monolith segments of porous material, each segment containing a plurality of passageways extending longitudinally from the feed end face to a retentate end face of the structure through which the feed stock flows to pass retentate from the device, the surface area of the passageways being at least 100 square feet per cubic foot of the structure;

b) a filtrate collection zone external to the structure disposed along the side of the structure and further including a barrier means, disposed at the feed and retentate ends of the structure, for inhibiting direct passage of the feed stock and retentate into the filtrate collection zone;

c) a filtrate conduit network within the structure for carrying filtrate toward the filtrate collection zone, the filtrate conduit network providing paths of lower flow resistance than that of alternative flow paths through the porous material;

d) the filtrate conduit network containing an intersegment filtrate conduit defined by the arrangement of the monolith segments;

e) the filtrate conduit network further containing at least one intrasegment filtrate conduit within at least one monolith segment, the intrasegment filtrate conduit comprised of a plurality of longitudinal chambers which extend substantially along the entire length of the monolith segment, the chambers being transected by a transverse channel which directs filtrate into the inter-segment filtrate conduit or toward the filtrate collection zone, and the intrasegment filtrate conduit communicating with the intersegment filtrate conduit or otherwise directing filtrate toward the filtrate collection zone; and f) the filtrate conduit network being isolated from the passageways at both end faces of the structure and at least some of the passageways being separated from the filtrate conduit network by intervening passageways.

16. The cross-flow filtration device of claim 15 in which the characteristic dimension of the monolith segments is in the range of two to seven inches.

17. The cross-flow filtration device of claim 16 further including a permselective membrane applied to the surfaces of the passageways.

18. The membrane device of claim 17 in which the permselective membrane is selected from the group of membranes suitable for microfiltration, ultrafiltration, nanofiltration, reverse osmosis, gas separations, or pervaporation.

19. A method of forming a filtrate conduit network in a structure containing a substantially parallel arrangement of a plurality of monolith segments of porous material, each segment containing a plurality of passageways extending longitudinally from a feed end face to a retentate end face, the surface area of the passageways being at least 100 square feet per cubic foot of the structure, comprising:

a) arranging the monolith segments to form an intersegment filtrate conduit in the space separating the segments, the intersegment filtrate conduit providing a flow path of low resistance for filtrate flow toward a filtrate collection zone;

b) within at least one selected segment, establishing an intrasegment conduit by selecting a plurality of passageways as filtrate chamber passageways to distribute the filtrate chamber passageways among the nonselected passageways in the selected segment to provide low pressure drop flow paths from the nonselected passageways through the porous material to nearby filtrate chamber passageways, and establishing at least one filtrate channel in the selected segment which transects the filtrate chamber passageways, the channel providing a flow path of low resistance for filtrate flow toward the filtrate collection zone or toward the intersegment conduit;

c) sealing the intersegment filtrate conduit at the end faces of the structure to inhibit direct passage of fluid into the intersegment filtrate conduit at the end faces; and d) sealing all filtrate chamber passageways and filtrate channels exposed at the end faces of the structure to inhibit direct passage of fluid into the intrasegment filtrate conduit.

20. A method of separating a feed stream in a cross-flow filtration device into a filtrate and a retentate, which method comprises:

a) providing a cross-flow filtration device of claim 1;

b) introducing a feed stream into the feed end face of the structure and into a plurality of the passageways for separation into a filtrate and retentate;

c) flowing the filtrate from the passageways through the intersegment filtrate conduit and the intrasegment filtrate conduit;

d) collecting the filtrate from the intersegment filtrate conduit and the intrasegment filtration conduit in the external collection zone; and e) removing the retentate from the retentate end face of the structure.

\* \* \* \* \*